July 30, 1935.  P. S. SHIELD  2,009,639
HYDRAULIC VALVE SYSTEM FOR TANKS
Filed Nov. 16, 1931   2 Sheets-Sheet 2
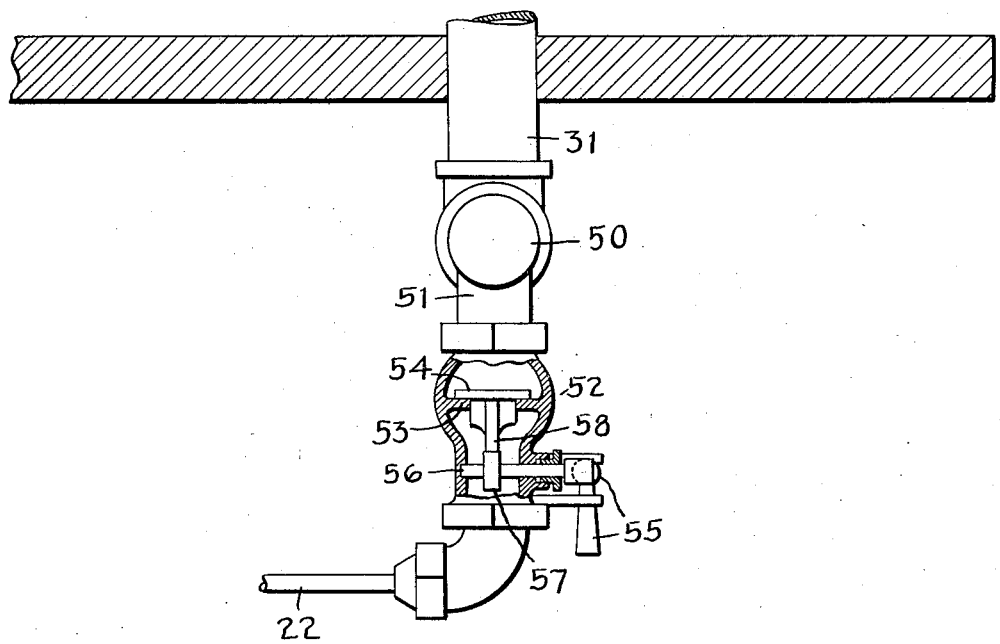
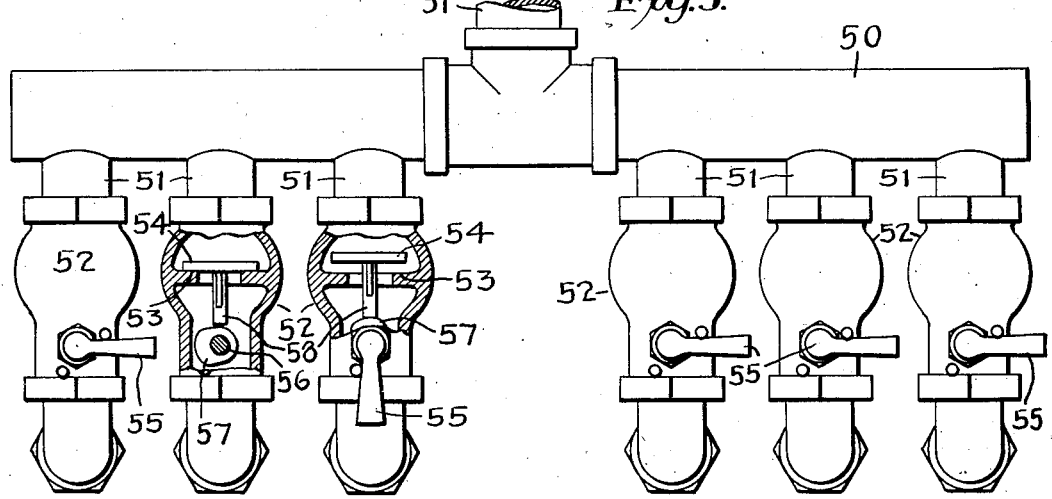

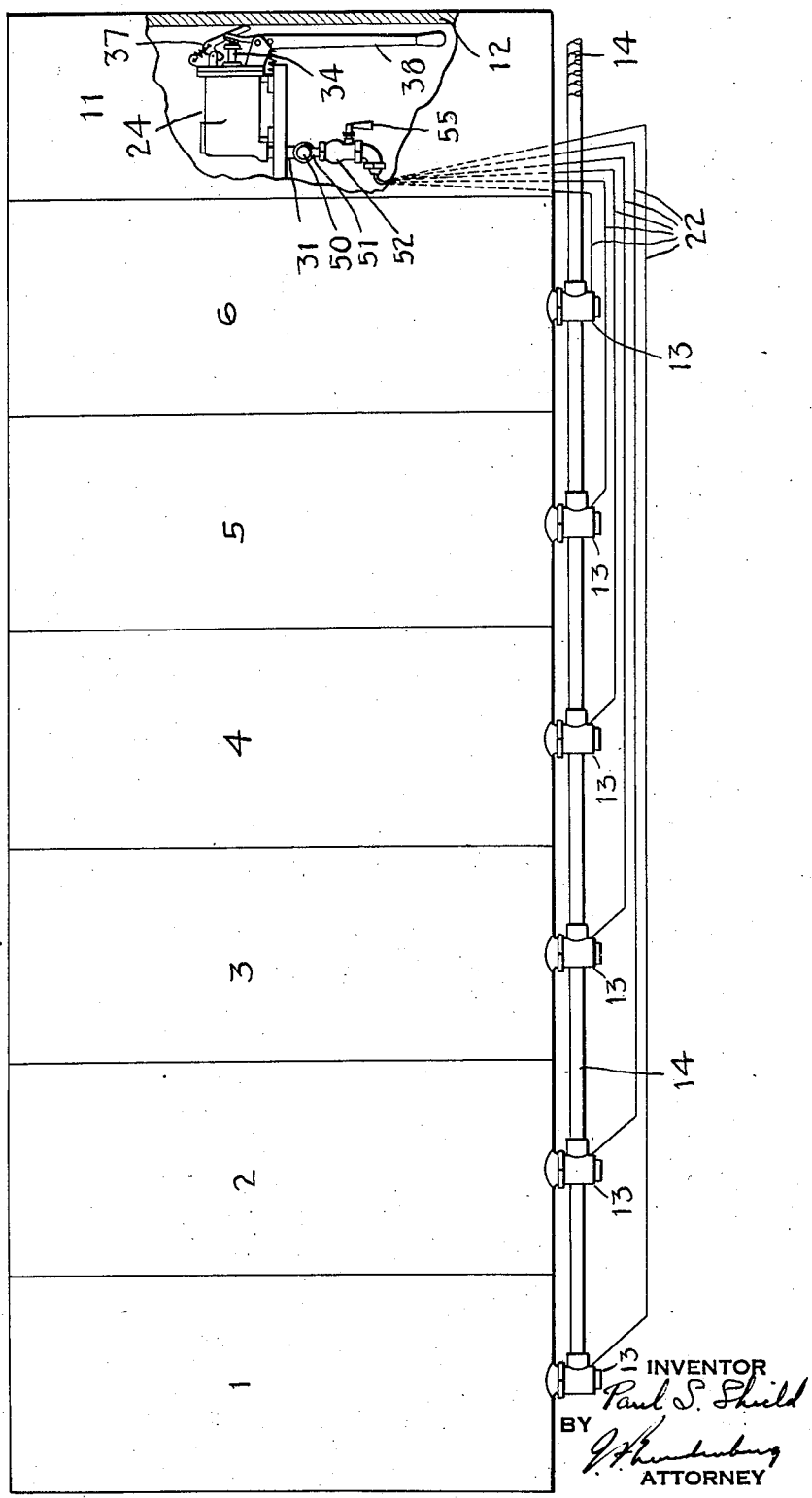

Patented July 30, 1935

2,009,639

UNITED STATES PATENT OFFICE 2,009,639

HYDRAULIC VALVE SYSTEM FOR TANKS

Paul S. Shield, Cincinnati, Ohio, assignor to Augustine Davis, Jr., Cincinnati, Ohio Application November 16, 1931, Serial No. 575,223

5 Claims. (Cl. 137—21)

The invention relates to a fluid-pressure system, more especially a hydraulic system, for operating a plurality of valves. It relates more particularly to the operation or control of the safety outlet valves of the compartments of a multiple-compartment truck tank or the like.

The object of the invention is to provide a selective apparatus of simple and inexpensive construction, which is also convenient to operate and not likely to get out of order, and which enables any one or any combination of the valves to be operated, at will, and which guards against the danger of any valve or valves being left in the operated condition when it or they should be restored to normal condition.

The system is of the type which includes an operating chamber connected by fluid lines with suitable servo-motors of the valves to be controlled. Pressure created in the operating chamber, as by means of a piston, is transmitted through the lines to the servo-motors to operate the subject valves. In a truck tank, the purpose is to open the normally-closed safety valves, which valves are "self-closing" by virtue of gravity, liquid head and/or springs, closing springs being customarily provided. When a delivery has been made from a compartment or compartments, it is important that the safety valve or valves which were opened be again closed.

In the apparatus described herein, the closing of any opened valve is brought about by retracting the plunger of the operating device, hereinafter termed the "operator", which permits liquid that was expelled from the operating chamber to return to it. Obviously such a system can be made selective by placing a stopcock in each of the lines, but, if the attendant closes a stopcock before releasing the piston of the operator, liquid will be trapped in that line and in the corresponding servo-motor, and the safety valve will be kept open indefinitely.

In the present invention this difficulty is overcome by the provision of a system of control valves which combines manual and automatic functions. By opening any one or more of a set of such valves, pressure can be transmitted to the servo-motors at the ends of those lines, to open their safety valve or valves, to unload the selected compartment or compartments. If these control valves should be closed before the piston of the operator is released, the safety valves will nevertheless be caused to close as soon as the piston is released, by reason of the automatic opening of a valve or valves of the control system. The automatic action of this valve or these valves is that of check-valves which are urged tightly closed under pressure from the operator but open readily to return flow to the operating chamber. The manual and automatic features cooperate so that only the selected safety valve or selected safety valves, and not others, will be opened when the piston of the operator is advanced, and so that any opened safety valve will surely be closed upon return of the piston.

The system disclosed herein is an embodiment of the invention of my application Serial No. 563,796, filed September 19, 1931. The object of the instant invention is to provide a construction which requires decidedly fewer parts than the form illustrated in my prior application and which possesses the same advantages in use.

The construction illustrated in the former application employed two sets of control valves in different branches, one set of valves being manually operable and the other set being automatic, together with two manifolds and connections which enabled the liquid to flow in one branch from the operator to a line leading to a selected tank valve, and to return from the line to the operator through another branch.

In the present invention, a single set of valves or valved connections is made to suffice. Each of these valves has manual means for opening it to permit pressure to be transmitted from the operator to one of the hydraulic tank valves, and is adapted to open, independently of such means, to the return flow of liquid when the tank valve is closed.

In the accompanying drawings forming part hereof:

Fig. 1 is a side elevation of a multi-compartment truck tank having the preferred embodiment of the invention applied to it, a portion of a box at the rear end of the tank being broken out to show parts within, and the control lines being shown in a schematic manner;

Fig. 2 is a fragmentary side elevation at the region of the control parts, the body of one of the control valves being in section; and Fig. 3 is a front elevation of this portion of the apparatus, "front" in this instance being the rear end of the tank structure, the bodies of two of the control valves being in section, one of these valves being shown open and the other closed.

The truck tank 10 is shown as having six compartments, designated 1-6. A box 11 housing the control portion of the apparatus is shown at the rear end of the tank, this box having a door 12.

The bottom of each tank compartment has an outlet opening and connected with it an outlet fitting and valve-body 13. This reference numeral will also be used in referring to the safety valves as units. Delivery pipes 14 extend from these fittings to the rear end of the tank, or other convenient point, where they are customarily provided with suitable delivery valves or faucets, not shown. The outlets of the tank compartments may be manifolded to a single delivery line if desired.

Each of the valves 13 is to be understood as containing a valve member which closes downward against a seat under spring pressure or otherwise, and a metal bellows device or other servo-motor for opening it hydraulically. It has not been thought necessary to illustrate details of these valves or of the operator 24 located in the box 11. For such illustration reference may be had to Patent Nos. 1,781,369 and 1,794,155 and my application Serial No. 563,796.

A separate hydraulic control line 22 is connected with each of the hydraulic tank valves. In the illustration there are six of these lines, corresponding to the number of compartments and safety valves.

The operator may be understood to be a cylinder and piston. The working chamber of the operator cylinder, the lines 22 and the expansible chambers of the servo-motors of the tank valves 13 are completely filled with oil or other liquid. All liquid expelled from the operator to open one or more of the tank valves returns to the operator with the closing of the safety valve or valves.

The rod 34 of the piston of the operator is advanced, to expel liquid, by a lever 38, and the operator is held in this condition against the thrust of a restoring spring (not shown) by a releasable detent 37.

To the lower end of the nipple 31, constituting the outlet and return connection of the operator, a manifold 50 is connected. This manifold is preferably a length of pipe closed at its ends.

Six branches 51, or one for each of the lines 22, are shown connected to the manifold, these branches preferably extending downward. Each branch contains a valve 52, in which is a seat 53 and a downwardly closing valve member 54. These valve members normally rest on their seats by virtue of gravity or by the equivalent, light spring pressure, and are held the more forcibly to their seats when pressure is exerted on the liquid by the operator.

Each valve has an operating handle 55 on the outside, and means operated by this handle for positively opening the valve, but it is an essential part of the invention that the valve be capable of opening automatically to return flow even though the operating means be in the closed position. While this may be accomplished in specifically different ways, the simplest embodiment is one in which each valve has a single valve member which can move relatively to its manual operating means. In the construction illustrated, each of the handles 55 is on a rock-shaft 56 passing through a stuffing-box in the wall of the valve body and carrying a cam 57 on the inside. In one position of the handle 55 this cam is out of contact with the stem 58 of the valve member 54, which is accordingly closed. By turning the handle from this position, the cam is caused to act on the valve member to move it and hold it away from its seat.

Ordinarily all of the valves 52 are closed, in which condition the handles 55 may be horizontal. In order to unload any given compartment of the tank, the attendant turns the handle 55 of the corresponding control valve to the vertical position. The handles being in series, it is easy to select the proper valve. Thus, in order to unload number 1 compartment, the attendant turns the first handle, and similarly for any other compartment. Any two or more of the compartments can be unloaded at the same time, if desired, by opening the corresponding control valves.

Assuming that one control valve has been opened, the attendant operates the operator to create pressure on the liquid, causing a movement of liquid through the opened control valve and the corresponding line 22 to the hydraulic safety valve 13 of the intended compartment. The pressure can not act through the other branches 51 and lines 22, to open other of the safety valves, because the valves 52 of these branches remain closed.

When the operator piston is released and is restored to its normal position, the return flow of liquid permits the safety valve 13 that was opened to close. This return flow takes place even though the attendant may have already moved the handle 55 to closed position, since the return flow of the liquid will automatically move the valve member 54 from its seat.

From the foregoing it will be evident that the safety valves may be opened individually or in any combination of two or more, by simply moving the corresponding handle or handles 55 to open position, and operating the operator, and that when the operator is restored to normal condition any opened safety valve or valves, whatever the combination, will be closed irrespective of the then condition of the handles 55 and their means for manually operating the control valves.

I claim:

1. In a multiple-compartment vehicle tank, the combination of hydraulic safety valves commanding the outlets from the tank chambers, separate hydraulic lines connected with said valves, a hydraulic operator, and a set of control valves, one of said control valves being interposed between each of said lines and the operator, and manual means for opening each of said control valves to permit operating flow and transmission of pressure to open a selected safety valve or valves, each of said control valves being adapted to open automatically to return flow from its line independently of said manual means, so that all open safety valves are closed when the hydraulic operator is actuated to close any of the safety valves.

2. In a multiple-compartment vehicle tank, the combination of safety valves commanding the outlets from the tank chambers, separate hydraulic motors for opening said valves, separate hydraulic lines connected with said hydraulic motors, a hydraulic operator having a connection through which liquid is expelled and returned, a manifold connected with said connection, a set of branches connected with said manifold and each connected with a different one of said lines, each of said branches containing a control valve having a valve member adapted to be opened by return flow so that all open safety valves are closed when the hydraulic operator is actuated to close any of the safety valves, a handle for each of said control valves, and devices operable by each of said handles for positively opening its valve member to permit the flow of liquid toward the associated hydraulic motor.

3. A valve operating system for multiple-compartment truck tanks, comprising a separate servo-motor for opening the valve of each compartment; a separate hydraulic control line connected with each of the servo-motors; a common manifold connected to all of the control lines; an operator for supplying liquid under pressure to the manifold and for withdrawing liquid from the manifold; a separate check-valve in each of the control lines between the servo-motor and the manifold; and independent manually-operated mechanism associated with each check-valve for holding said check-valve open so that liquid from the manifold can be forced through the control line to the servo-motor, each check-valve being so connected in the line that liquid returns from the servo-motor through the same conduits by which it is supplied to said servo-motor and all open valves of said compartments close, irrespective of the positions of said manually-operated mechanisms, when the operator is actuated to withdraw liquid from the manifold.

4. In fluid-controlled apparatus for operating all or any one or any combination of a plurality of valves, the combination comprising a plurality of servo-motors one for each of such valves, an operating chamber, means for changing the pressure of a fluid within said chamber, a plurality of lines, one for each of said servo-motors and connecting said servo-motors with said chamber, check-valves, one in each of said lines, preventing transmission of fluid therethrough in a direction to operate the associated servo-motor to open its associated valve but permitting transmission of fluid in the reverse direction so that all of said valves close when the pressure-changing means is actuated to close any one of said valves, and manually-operated mechanisms connected one with each of said automatic means to positively hold open its associated check-valve so that a change in pressure in said chamber causes operation of the associated servo-motor.

5. The combination with a truck-tank comprising a plurality of compartments each provided with an outlet, and normally closed safety valves commanding said outlets; of fluid-actuated servo-motors for opening said safety valves, an operating chamber, means for changing the pressure in said chamber, lines connecting said chamber with each of said servo-motors, check-valves one in each of said lines so connected as to prevent transmission of the operating fluid therethrough in a direction to operate the associated servo-motor to open its associated safety valve but permitting transmission of fluid in the reverse direction so that all of said valves close when the pressure-changing means is actuated to close any one of said valves, and devices one connected to each of said check-valves to positively hold open its associated check-valve so that a change in pressure in said chamber causes operation of the associated servo-motor.

PAUL S. SHIELD.